(12) United States Patent
Kitano et al.

(10) Patent No.: US 11,215,487 B2
(45) Date of Patent: Jan. 4, 2022

(54) FLOW RATE MEASUREMENT DEVICE

(71) Applicant: Panasonic Intellectual Property Management Co., Ltd., Osaka (JP)

(72) Inventors: Yusuke Kitano, Kanagawa (JP); Mitsuo Yokohata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

(21) Appl. No.: 16/622,239

(22) PCT Filed: Aug. 9, 2018

(86) PCT No.: PCT/JP2018/029849
§ 371 (c)(1),
(2) Date: Dec. 12, 2019

(87) PCT Pub. No.: WO2019/044445
PCT Pub. Date: Mar. 7, 2019

(65) Prior Publication Data
US 2020/0200576 A1 Jun. 25, 2020

(30) Foreign Application Priority Data

Aug. 31, 2017 (JP) .............................. JP2017-166349
Feb. 16, 2018 (JP) .............................. JP2018-025603

(51) Int. Cl.
*G01F 1/66* (2006.01)
*H01M 8/0438* (2016.01)

(52) U.S. Cl.
CPC ............ *G01F 1/66* (2013.01); *H01M 8/0438* (2013.01)

(58) Field of Classification Search
CPC ........ G01F 1/66; G01F 15/0755; G01F 15/06; H01M 8/0438; H01M 8/04388; Y02E 60/50
See application file for complete search history.

(56) References Cited

U.S. PATENT DOCUMENTS

2013/0312513 A1\* 11/2013 Yokohata .................. G01F 3/22
73/198
2014/0069204 A1 3/2014 Nagatomo et al.
2014/0238147 A1 8/2014 Yokohata et al.

FOREIGN PATENT DOCUMENTS

| CN | 103534556 | 1/2014 |
|---|---|---|
| CN | 103890492 | 6/2014 |
| JP | 2012-237700 | 12/2012 |

OTHER PUBLICATIONS

International Search Report of PCT application No. PCT/JP2018/029849 dated Sep. 4, 2018.
(Continued)

*Primary Examiner* — Benjamin R Schmitt
(74) *Attorney, Agent, or Firm* — Wenderoth, Lind & Ponack L.L.P.

(57) ABSTRACT

A flow rate measurement device includes a flow rate measurer to measure a fluid flow rate at regular time intervals, a period setting unit, an arithmetic unit to calculate first average flow rates and amounts of change each between the average flow rates in sequence, and second average flow rates and amounts of change each between the average flow rates in sequence, and a fuel cell determinator to determine whether a fuel cell is in operation. The fuel cell determinator determines that a fuel cell is in operation when an increment of the second average flow rate repeats for first predetermined successive times, an increment of the first average flow rate repeats for second predetermined times or more in each of the second periods, and an increment of the first
(Continued)

average flow rate not greater than or equal to a third predetermined flow rate in each of the second periods.

2 Claims, 10 Drawing Sheets

(56) References Cited

OTHER PUBLICATIONS

English Translation of Chinese Search Report dated Nov. 4, 2020 in corresponding Chinese Patent Application No. 201880053344.5.

* cited by examiner

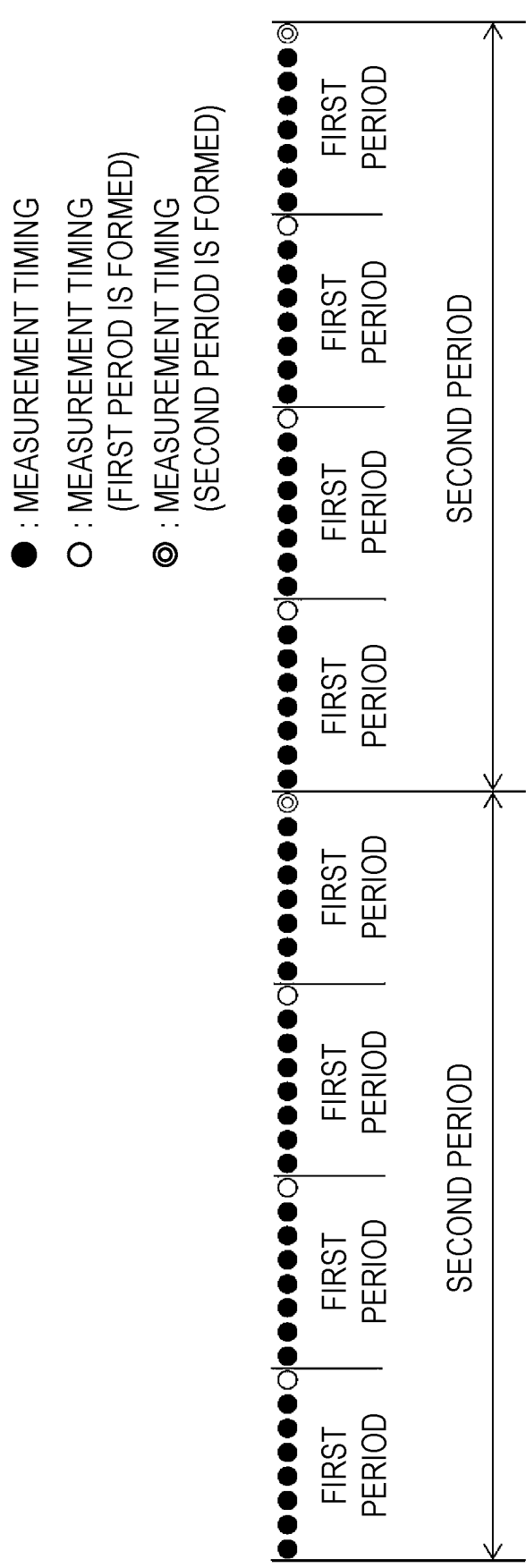

FIG. 3B

| n | Q8(n) | Q32(n) | ΔQ8 | ΔQ32 |
|---|---|---|---|---|
| 33 | 21.679 | - | -0.094 | - |
| 41 | 22.565 | - | 0.886 | - |
| 49 | 24.707 | - | 2.142 | - |
| 57 | 26.071 | 23.756 | 1.364 | 2.202 |
| 65 | 25.171 | - | -0.900 | - |
| 73 | 28.152 | - | 2.981 | - |
| 81 | 28.804 | - | 0.652 | - |
| 89 | 29.812 | 27.985 | 1.008 | 4.229 |
| 97 | 29.372 | - | -0.439 | - |
| 105 | 31.640 | - | 2.268 | - |
| 113 | 33.106 | - | 1.465 | - |
| 121 | 34.434 | 32.138 | 1.328 | 4.153 |
| 129 | 33.761 | - | -0.673 | - |
| 137 | 37.030 | - | 3.269 | - |
| 145 | 38.167 | - | 1.138 | - |
| 153 | 39.899 | 37.214 | 1.732 | 5.076 |

| n | Q8(n) | Q32(n) | ΔQ8 | ΔQ32 |
|---|---|---|---|---|
| 161 | 39.143 | - | -0.756 | - |
| 169 | 43.196 | - | 4.054 | - |
| 177 | 44.914 | - | 1.717 | - |
| 185 | 46.498 | 43.438 | 1.584 | 6.223 |
| 193 | 45.666 | - | -0.832 | - |
| 201 | 49.460 | - | 3.794 | - |
| 209 | 51.041 | - | 1.580 | - |
| 217 | 51.998 | 49.541 | 0.958 | 6.104 |
| 225 | 51.264 | - | -0.734 | - |
| 233 | 53.118 | - | 1.854 | - |
| 241 | 53.071 | - | -0.047 | - |
| 249 | 52.614 | 52.517 | -0.457 | 2.975 |
| 257 | 52.675 | - | 0.061 | - |
| 265 | 51.037 | - | -1.638 | - |
| 273 | 49.781 | - | -1.256 | - |
| 281 | 48.247 | 50.435 | -1.534 | -2.082 |

FIG. 4B

| n | Q8(n) | Q32(n) | ΔQ8 | ΔQ32 | n | Q8(n) | Q32(n) | ΔQ8 | ΔQ32 |
|---|---|---|---|---|---|---|---|---|---|
| 9 | 42.145 | - | 42.145 | - | 137 | 101.007 | - | -0.136 | - |
| 17 | 44.223 | - | 2.078 | - | 145 | 100.962 | - | -0.045 | - |
| 25 | 18.647 | - | -25.576 | - | 153 | 100.980 | - | 0.018 | - |
| 33 | 19.952 | 31.242 | 1.305 | 31.242 | 161 | 89.784 | 98.183 | -11.196 | -3.090 |
| 41 | 110.102 | - | 90.150 | - | 169 | 61.886 | - | -27.898 | - |
| 49 | 110.109 | - | 0.007 | - | 177 | 77.255 | - | 15.369 | - |
| 57 | 109.880 | - | -0.229 | - | 185 | 43.611 | - | -33.643 | - |
| 65 | 108.112 | 109.551 | -1.769 | 78.309 | 193 | 43.619 | 56.593 | 0.008 | -41.590 |
| 73 | 101.425 | - | -6.687 | - | 201 | 43.566 | - | -0.053 | - |
| 81 | 101.413 | - | -0.012 | - | 209 | 43.446 | - | -0.120 | - |
| 89 | 101.486 | - | 0.073 | - | 217 | 43.499 | - | 0.053 | - |
| 97 | 101.450 | 101.444 | -0.036 | -8.107 | 225 | 43.322 | 43.458 | -0.178 | -13.135 |
| 105 | 101.327 | - | -0.124 | - | 233 | 43.352 | - | 0.030 | - |
| 113 | 101.340 | - | 0.014 | - | 241 | 43.215 | - | -0.137 | - |
| 121 | 101.281 | - | -0.059 | - | 249 | 43.295 | - | 0.080 | - |
| 129 | 101.143 | 101.273 | -0.138 | -0.171 | 257 | 43.217 | 43.270 | -0.077 | -0.188 |

FLOW RATE MEASUREMENT DEVICE

CROSS-REFERENCE TO RELATED APPLICATIONS

This application is a U.S. national stage application of the PCT International Application No. PCT/JP2018/029849 filed on Aug. 9, 2018, which claims the benefit of foreign priority of Japanese patent applications No. 2017-166349 filed on Aug. 31, 2017 and No. 2018-025603 filed on Feb. 16, 2018, the contents all of which are incorporated herein by reference.

TECHNICAL FIELD

The present invention relates to a technique for discriminating a gas appliance in operation by detecting a change in a flow rate of gas.

BACKGROUND ART

In a fluid piping system, a gas appliance determination unit incorporated in the fluid piping system is designed to identify an appliance (particularly a fuel cell) in operation according to a conventionally proposed configuration shown below.

Specifically, the conventional gas appliance determination unit extracts fuel cell determination flow rates (an instantaneous flow rate and a moving average value) based on gas flow rates measured by a flow rate measurer at regular time intervals and determines a fuel cell in operation when the fuel cell determination flow rates satisfy a predetermined condition (for example, see PTL 1).

CITATION LIST

Patent Literature

PTL 1: Unexamined Japanese Patent Publication No. 2012-237700

SUMMARY OF THE INVENTION

Unfortunately, gas flow rates measured at regular time intervals change (fluctuate) in some cases because of a gas appliance installation environment and other factors. The method of discriminating a gas appliance in operation by comparing an instantaneous flow rate and a moving average value according to the conventional configuration can disadvantageously make an error in determining whether or not a fuel cell is in operation.

An exemplary flow rate measurement device according to the present invention includes a flow rate measurer to measure a flow rate of a fluid at regular time intervals, the fluid flowing in a flow path and a period setting unit to set a first period for M flow rates measured by the flow rate measurer and set a second period made up of N first periods each being the first period, each of M and N being an integer greater than or equal to 2. The exemplary flow rate measurement device according to the present invention further includes an arithmetic unit to calculate a first average flow rate of the M flow rates in the first period, and calculate a second average of M×N flow rates in the second period, and a fuel cell determinator to determine that a fuel cell is in operation when the first average flow rate and the second average flow rate calculated by the arithmetic unit satisfy all conditions (A), (B), and (C) specified below:

(A) an increment of the second average flow rate within a first predetermined flow rate range repeats for first predetermined successive times (in other words, a change in average flow rate for every relatively long period always shows a slightly upward trend);

(B) an increment of the first average flow rate within a second predetermined flow rate range repeats for second predetermined times or more in each of the second periods (in other words, a change in average flow rate for every relatively short period, but not always, shows a slightly upward trend); and (C) an increment of the first average flow rate not greater than or equal to a third predetermined flow rate in each of the second periods (in other words, the flow rate does not vary greatly).

This configuration enables a grasp of a characteristic of a fuel cell, i.e., a gradual rise in the flow rate of a gas consumed by the fuel cell, and provides an improvement in accuracy with which the flow rate measurement device determines whether or not a fuel cell is in operation.

According to the flow rate measurement device of the present invention, even in an environment where fluid flow rates measured at regular time intervals change (fluctuate), the flow rate measurement device can determine whether or not a fuel cell is in operation based on average flow rates for the first periods and the second periods.

BRIEF DESCRIPTION OF DRAWINGS

FIG. 2 is a diagram showing a relationship between a first period and a second period to illustrate operation of the flow rate measurement device according to the first exemplary embodiment of the present invention.

FIG. 3B is a table showing 8th-order period average flow rates and amounts of change, and 32nd-order period average flow rates and amounts of change that are obtained from flow rate data measured at measurement times within a range enclosed with a dot-and-dash line in FIG. 3A.

FIG. 4B is a table showing 8th-order period average flow rates and amounts of change, and 32nd-order period average flow rates and amounts of change that are obtained from flow rate data measured at measurement times within a range enclosed with a dot-and-dash line in FIG. 4A.

DESCRIPTION OF EMBODIMENTS

Figure 1:
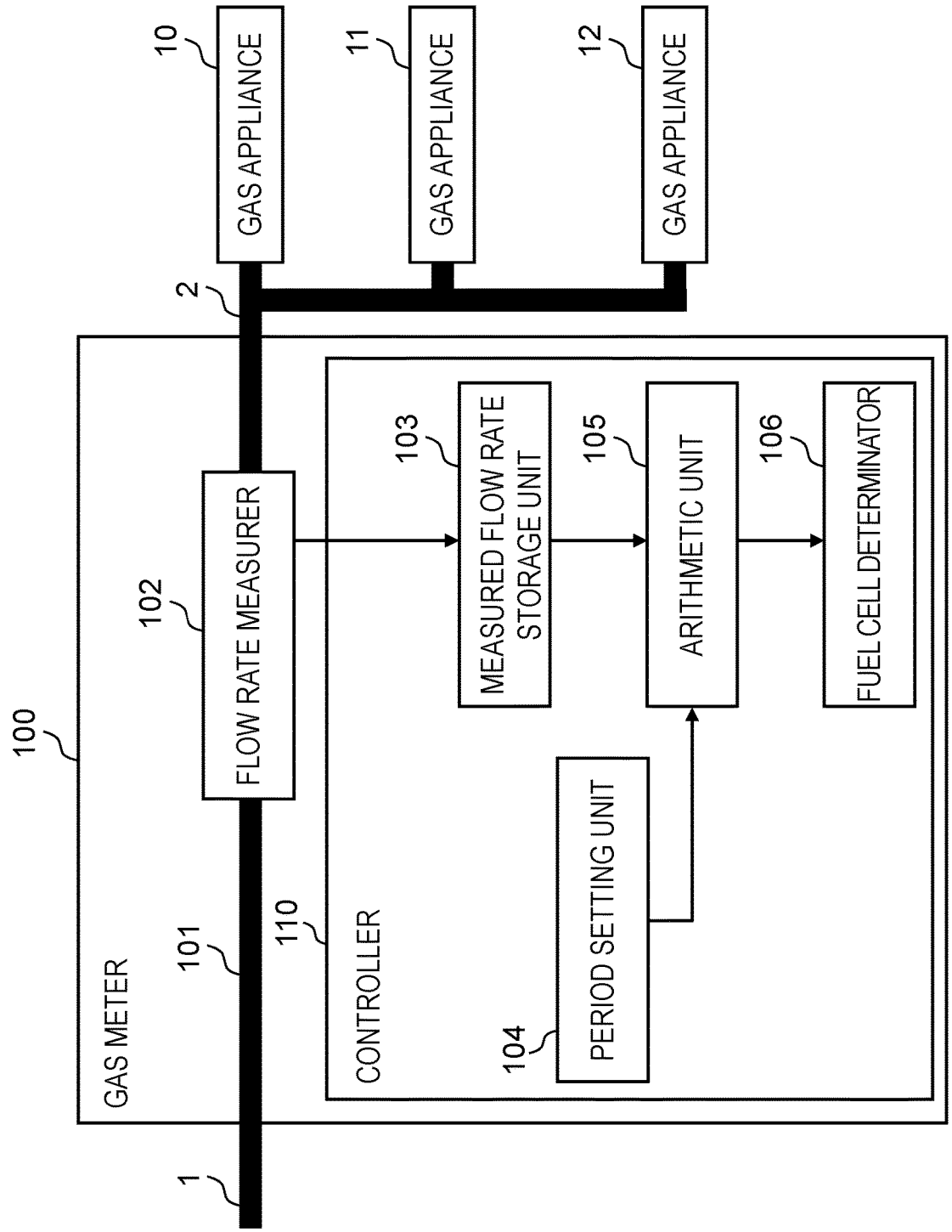
FIG. 1 is a block diagram showing an exemplary configuration of a flow rate measurement device according to a first exemplary embodiment of the present invention.

Exemplary embodiments of a flow rate measurement device according to the present invention will now be described with reference to the accompanying drawings. In the exemplary embodiments described below, a gas meter will be described as an example of the flow rate measurement device, and processing thereof will be described. In the drawings, identical constituent elements are given the same numerals or symbols, and repeated description of constituent elements that have already been described will be omitted. The present invention is not limited to the exemplary embodiments described below.

First Exemplary Embodiment (Exemplary Configuration of Flow Rate Measurement Device)

FIG. 1 is a block diagram of a flow rate measurement device according to a first exemplary embodiment of the present invention.

With reference to FIG. 1, gas meter 100, a flow rate measurement device, includes flow path 101, flow rate measurer 102, measured flow rate storage unit 103, period setting unit 104, arithmetic unit 105, and fuel cell determinator 106. Gas meter 100 is connected to gas pipe 1 and is connected to gas appliances 10 to 12 through gas pipe 2 disposed downstream of gas meter 100.

Flow rate measurer 102 acting as an ultrasonic flowmeter emits ultrasonic waves to gas, a fluid flowing in flow path 101, at regular time intervals (e.g., every 0.5 second or every 2 seconds) to measure a flow rate of the gas, and may be a typical ultrasonic flowmeter. Measured flow rate storage unit 103 stores subject data, a description of flow rate data that is measured with flow rate measurer 102 and that is associated with measurement times at which the flow rate data is measured.

Period setting unit 104 sets a plurality of first periods that are each assigned for every M pieces (M is an integer greater than or equal to 2; for example, 8 pieces) of flow rate measured values stored in measured flow rate storage unit 103 and sets a second period made up of N pieces (N is an integer greater than or equal to 2; for example, 4 pieces) of the plurality of first periods.

In the present exemplary embodiment, a description will be hereinafter given on condition that M=8 and N=4, for example. FIG. 2 is a diagram showing first periods and second periods when M=8 and N=4. In FIG. 2, the symbol ● indicates timing at which flow rate measurer 102 measures a flow rate. A first period is set at timing of ○ for every 8 pieces of flow rate data, and a second period is set at timing of ⊚ every time four pieces of the first periods are set.

Arithmetic unit 105 calculates a first average flow rate from 8 pieces of flow rate data in the first period and calculates a second average flow rate from 32 pieces of flow rate data in the second period. In the description given hereinafter, the first period, the second period, the first average flow rate, and the second average flow rate are referred to as an 8th-order period, a 32nd-order period, an 8th-order period average flow rate, and a 32nd-order period average flow rate respectively.

Figure 3A:
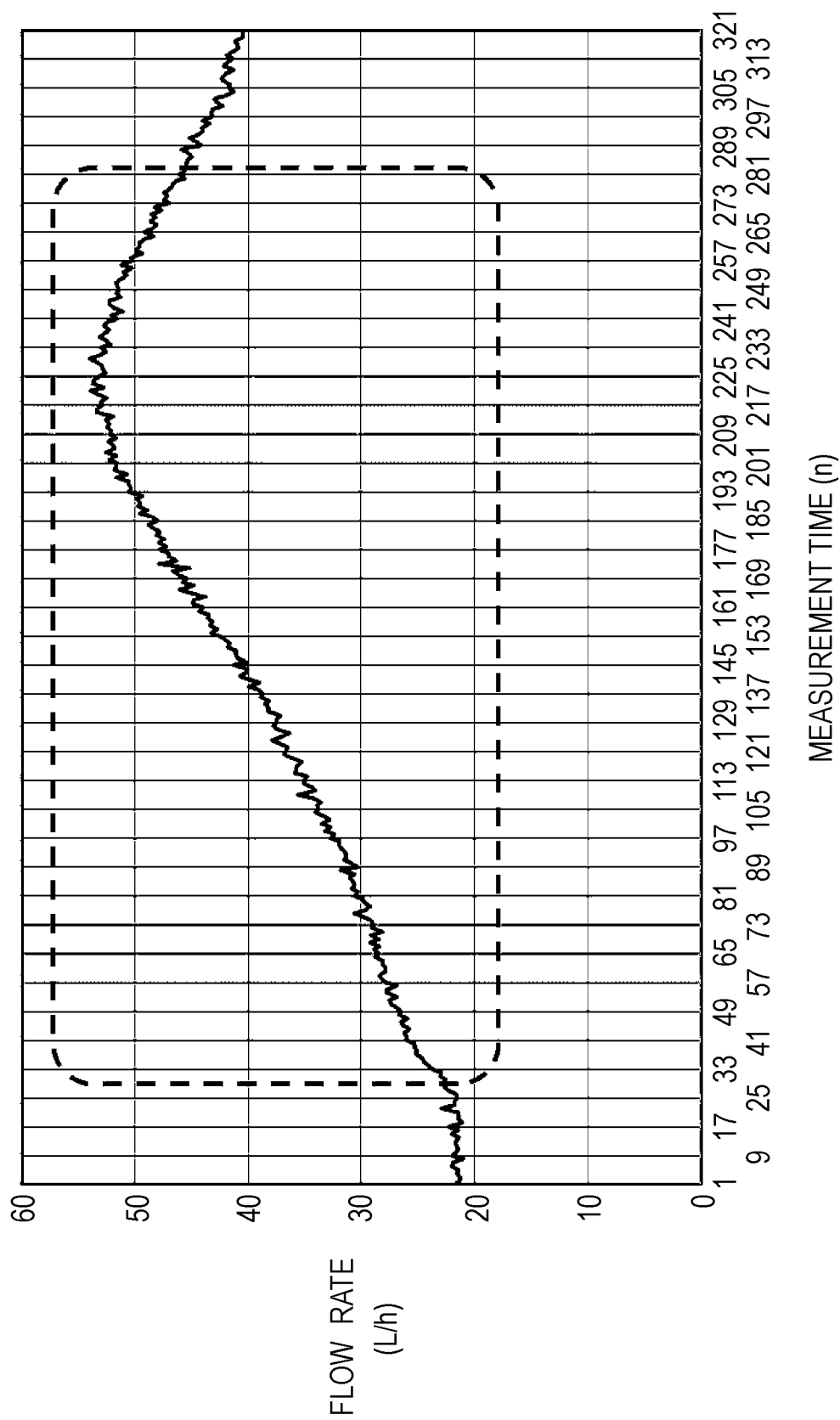
FIG. 3A is a graph showing an example of a change in flow rate of a gas used for a fuel cell at a start of operation.

FIG. 3A is a graph showing an example of a change in flow rate of a gas used for a fuel cell at a start of operation. FIG. 3B is a table showing later-described 8th-order period average flow rate $Q8(n)$ and 32nd-order period average flow rate $Q32(n)$ that are obtained from data about flow rates measured at measurement time (n) within a range enclosed with a dot-and-dash line in FIG. 3A, and increased flow rate $\Delta Q8$ between 8th-order period average flow rate $Q8(n)$ and previous 8th-order period average flow rate $Q8(n-8)$ and increased flow rate $\Delta Q32$.

Figure 4A:
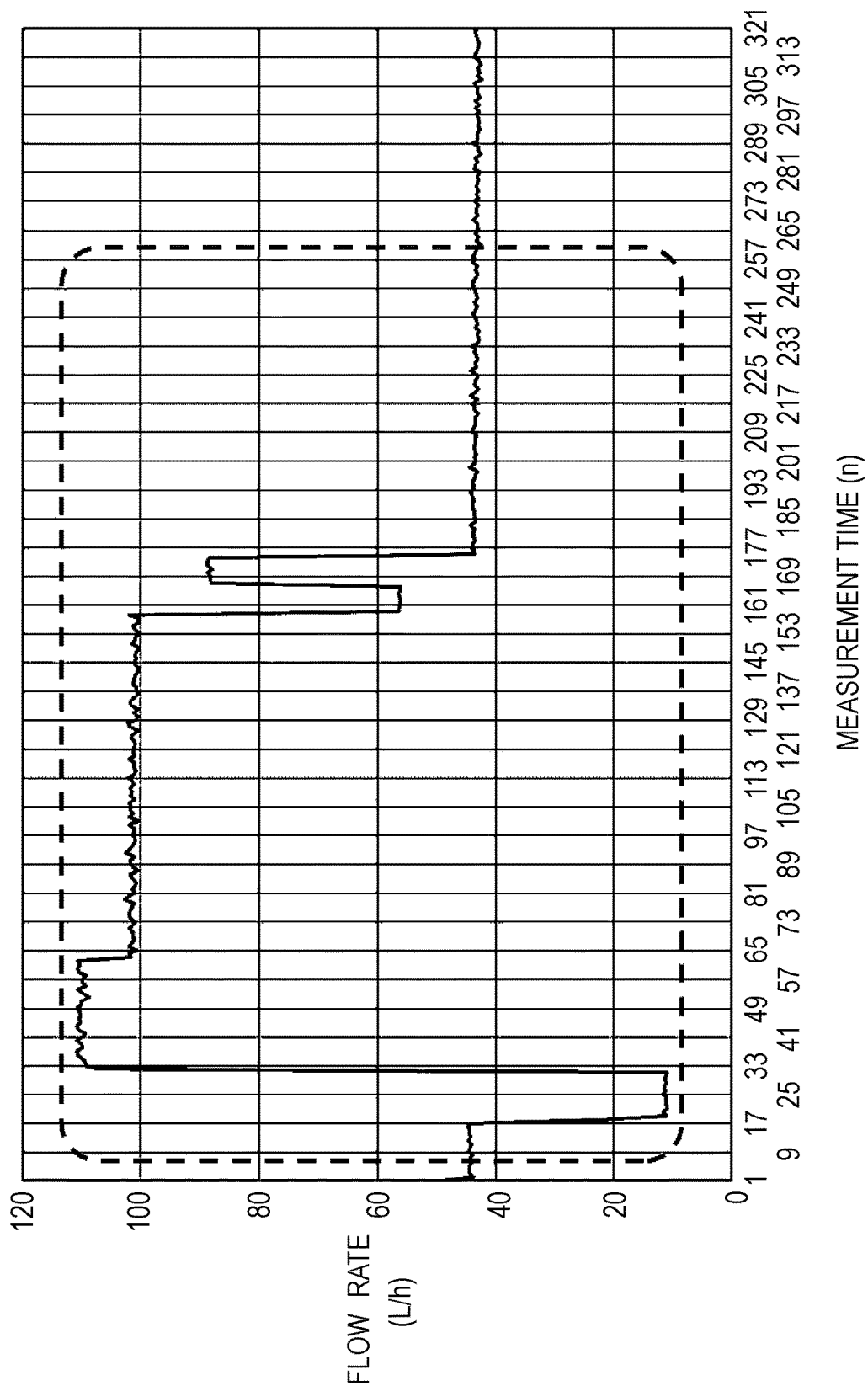
FIG. 4A is a graph showing an example of a change in flow rate of a gas used for a gas stove at a start of operation.

Similarly, FIG. 4A are a graph showing an example of a change in flow rate of a gas used for a gas stove in operation, which is illustrated to draw a contrast between results of the fuel cell and the gas stove. FIG. 4B is a table showing later-described 8th-order period average flow rate $Q8(n)$ and 32nd-order period average flow rate $Q32(n)$ that are obtained from data about flow rates measured at measurement time (n) within a range enclosed with a dot-and-dash line in FIG. 4A, and increased flow rate $\Delta Q8$ between 8th-order period average flow rate $Q8(n)$ and previous 8th-order period average flow rate $Q8(n-8)$ and increased flow rate $\Delta Q32$ between 32nd-order period average flow rate $Q32(n)$ and previous 32nd-order period average flow rate $Q32(n-32)$.

In the graph, the vertical axis indicates flow rates [L/h], while the horizontal axis indicates consecutive numbers assigned to flow rate data measured by flow rate measurer 102 at regular time intervals and represents measurement time (n) herein.

Fuel cell determinator 106 extracts fuel cell determination flow rates including a fuel cell characteristic of a gradual flow rate rise from flow rate data calculated by arithmetic unit 105 and determines whether or not the extracted fuel cell determination flow rates satisfy the following three conditions to determine whether or not a fuel cell is in operation.

Condition (a): The increment of the 32nd-order period average flow rates, i.e., the second average flow rates within a first predetermined flow rate range (e.g., greater than or equal to 2 L/h and less than 10 L/h) repeats for first predetermined successive times (e.g., 5 times).

Condition (b): The increment of the 8th-order period average flow rates, i.e., the first average flow rates within a second predetermined flow rate range (e.g., greater than or equal to 0 L/h and less than 5 L/h) repeat for second predetermined times (e.g., 2 times) or more in the 32nd-order period, i.e., the second period.

Condition (c): The increment of the 8th-order period average flow rates, i.e., the first average flow rates not greater than or equal to a third predetermined flow rate (e.g., not greater than or equal to 10 L/h) in the 32nd-order period, i.e., the second period.

Fuel cell determinator 106 determines that the fuel cell is in operation when the three conditions described above are satisfied.

With reference to the flowchart of FIG. 5, a process executed by fuel cell determinator 106 will now be described.

In step S10, the fuel cell determinator determines whether or not the first period, an 8th-order period, is set by period setting unit 104. When an 8th-order period is set, arithmetic unit 105 averages 8 pieces of flow rate data included in one 8th-order period and calculates increased flow rate $\Delta Q8(n)$ between 8th-order period average flow rate $Q8(n)$ and previous 8th-order period average flow rate $Q8(n-8)$, i.e., between the first average flow rates in sequence, in step S20.

For a fuel cell shown in FIGS. 3A and 3B, 8th-order period average flow rate $Q8(33)$ obtained at measurement time n=33 is 21.679, a value obtained by averaging 8 pieces of flow rate data (not shown) measured at measurement time n=26 through measurement time n=33, and the 8th-order period average flow rate is a value obtained every time measurement time n increases by 8. Increased flow rate $\Delta Q8$ at measurement time n=41 is a difference of 0.886 between 22.565, 8th-order period average flow rate Q8(41) obtained at measurement time n=41, and 21.679, previous 8th-order period average flow rate Q8(33). A minus sign indicates a decrease.

In step S30, the fuel cell determinator determines whether or not a 32nd-order period is set by period setting unit 104. When a 32nd-order period is set, arithmetic unit 105 calculates increased flow rate $\Delta Q32(n)$ between 32nd-order period average flow rate Q32(n) and previous 32nd-order period average flow rate Q8(n−8) in step S40.

For the fuel cell shown in FIGS. 3A and 3B, 32nd-order period average flow rate Q32(57) obtained at measurement time n=57 is 23.756, a mean value of four 8th-order period average flow rates obtained at measurement times n=33, n=41, n=49, n=57, and the 32nd-order period average flow rate is a value obtained every time measurement time n increases by 32. Increased flow rate $\Delta Q32$ at measurement time n=89 is a difference of 4.229 between 27.985, 32nd-order period average flow rate Q32(89) obtained at measurement time n=89, and 23.756, previous 32nd-order period average flow rate Q32(57).

In step S50, the fuel cell determinator determines whether or not 32nd-order period average flow rate $\Delta Q32(n)$ calculated in step S40 is within the first predetermined flow rate range, an element of condition (a). When $\Delta Q32(n)$ is within the first predetermined flow rate range, the fuel cell determinator increases a number of successive times by 1 in step S60. When $\Delta Q32(n)$ is outside the range, the fuel cell determinator resets the number of successive times to zero in step S70.

For the fuel cell shown in FIGS. 3A and 3B, all 7 pieces of 32nd-order period average flow rate $\Delta Q32(n)$ obtained at measurement times n=57 to n=249 are within the first predetermined flow rate range (greater than or equal to 2 L/h and less than 10 L/h) and the number of successive times increases accordingly.

In step S80, the fuel cell determinator determines whether or not condition (b) is satisfied, i.e., 8th-order period average flow rate $\Delta Q8(n)$ is within the second predetermined flow rate range (e.g., greater than or equal to 0 L/h and less than 5 L/h) for the second predetermined times (e.g., 2 times) or more in the 32nd-order period. When $\Delta Q8(n)$ is within the range for the second predetermined times or more, the process makes a transition to step S90. If not, the fuel cell determinator resets the number of successive times to zero in step S70.

For the fuel cell shown in FIGS. 3A and 3B, 8th-order period average flow rate $\Delta Q8(n)$ obtained at measurement times n=33 to n=217 is within the second predetermined flow rate range (greater than or equal to 0 L/h and less than 5 L/h) for the second predetermined times (2 times) or more in every 32nd-order period. Hence, the process makes a transition to step S90.

In step S90, the fuel cell determinator determines whether or not 8th-order period average flow rate $\Delta Q8(n)$ is greater than or equal to the third predetermined flow rate (e.g., greater than or equal to 10 L/h) in the 32nd-order period. When $\Delta Q8(n)$ is not greater than or equal to the predetermined flow rate, the process makes a transition to step S100. If it is, the fuel cell determinator resets the number of successive times to zero in step S70.

For the fuel cell shown in FIGS. 3A and 3B, $\Delta Q8(n)$ obtained at measurement times n=33 to n=281 is not greater than or equal to the third predetermined flow rate (e.g., not greater than or equal to 10 L/h) and thus satisfies condition (c).

In step S100, the fuel cell determinator determines whether or not the number of successive times that has increased in step S60 reaches the first predetermined times (e.g., 5 times). When the number has reached the predetermined times, gas meter 100 stores information about a fuel cell presence, i.e., information about the presence of a fuel cell in operation, in step S110. When the number has not reached the predetermined times, gas meter 100 stores information about a fuel cell absence, i.e., information about the absence of a fuel cell in operation, in step S120, and the process goes back to step S10 to repeat determination of whether or not a fuel cell is in operation.

For the fuel cell shown in FIGS. 3A and 3B, as described above, $\Delta Q32(n)$ obtained at measurement times n=57 to n=249 is within the first predetermined flow rate range, an element of condition (a), and $\Delta Q8(n)$ obtained at measurement times n=33 to n=217 satisfies condition (b). At the same time, $\Delta Q8(n)$ obtained at measurement times n=33 to n=281 satisfies condition (c). Thus, the number of successive times increases at measurement times n=57, n=89, n=121, n=153, n=185. Consequently, all conditions (a) to (c) are satisfied at measurement time n=185. This enables the fuel cell determinator to determine that the fuel cell has started operation.

Meanwhile, it is apparent that a gas stove shown in FIGS. 4A and 4B does not satisfy these conditions.

A new condition may be added in the determination process described above by similarly setting a 64th-order period made up of 2 pieces of 32nd-order periods and adding the new period so as to add the new condition that necessitates calculating 64th-order period average flow rates.

According to the exemplary embodiment of the present invention described above, even in an environment where fluid flow rates measured at regular time intervals change (fluctuate), the gas meter can determine whether or not a fuel cell is in operation based on period average flow rates.

(Hardware Configuration)

Figure 6:
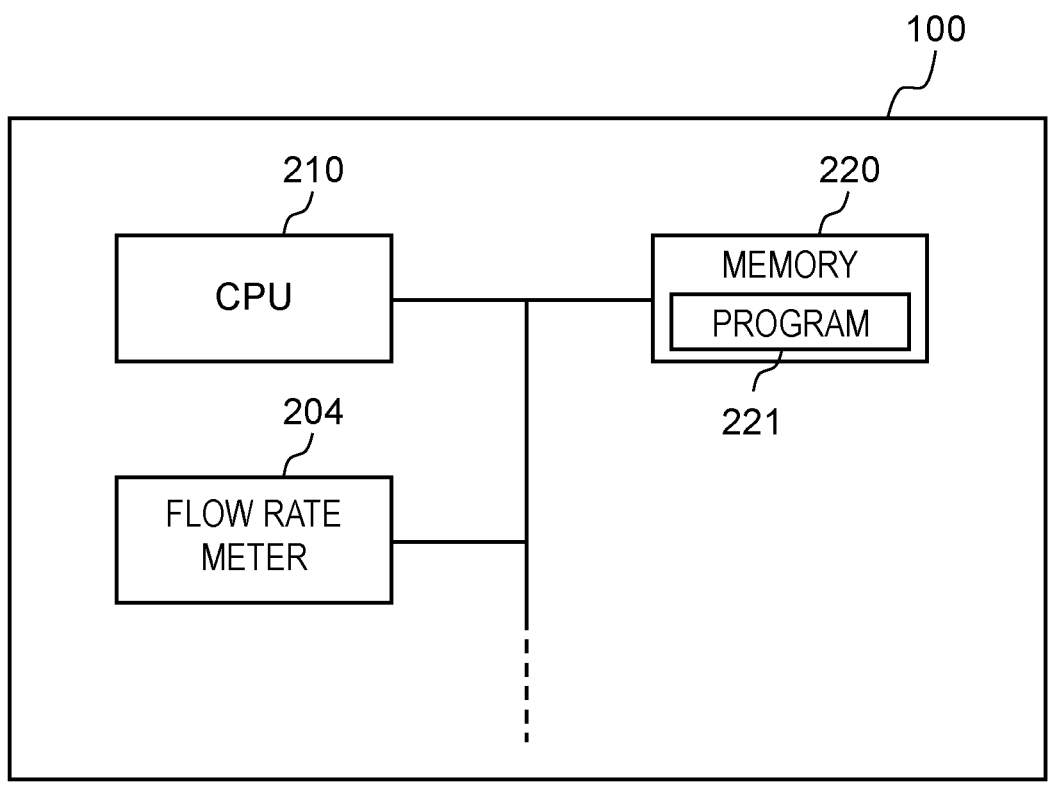
FIG. 6 is a block diagram showing an example of a hardware configuration of a gas meter that is the flow rate measurement device according to the first exemplary embodiment of the present invention.

FIG. 6 shows an example of a hardware configuration of gas meter 100. In the configuration illustrated in FIG. 6, gas meter 100 includes central processing unit (CPU) 210, memory 220, and flow rate meter 204. Flow rate meter 204 is an example of flow rate measurer 102 shown in FIG. 1 and may be a publicly known flow rate meter such as an ultrasonic flowmeter.

CPU 210 executes computer program 221 stored in memory 220. Computer program 221 contains a description of the various steps described above. CPU 210, for example, executes various steps performed by arithmetic unit 105 and fuel cell determinator 106 shown in FIG. 1. Memory 220 typically includes random-access memory (RAM) and read-only memory (ROM) and has, for example, data corresponding to the first predetermined flow rate range and the first predetermined times. Part of arithmetic unit 105 and fuel cell determinator 106 may constitute memory 220.

Arithmetic unit 105 and fuel cell determinator 106 may be part of a single processor (CPU 210). Controller 110 may be set of an assemblage of a plurality of processors. Controller 110 may include at least one memory and a peripheral circuit. At least one memory may be disposed outside controller 110. For instance, fuel cell determinator 106 may be disposed outside controller 110. Gas meter 100 executes the various steps described above using CPU 210 and memory 220 (see FIG. 6) and thereby can discriminate an operating appliance with high accuracy.

Second Exemplary Embodiment

Figure 7:
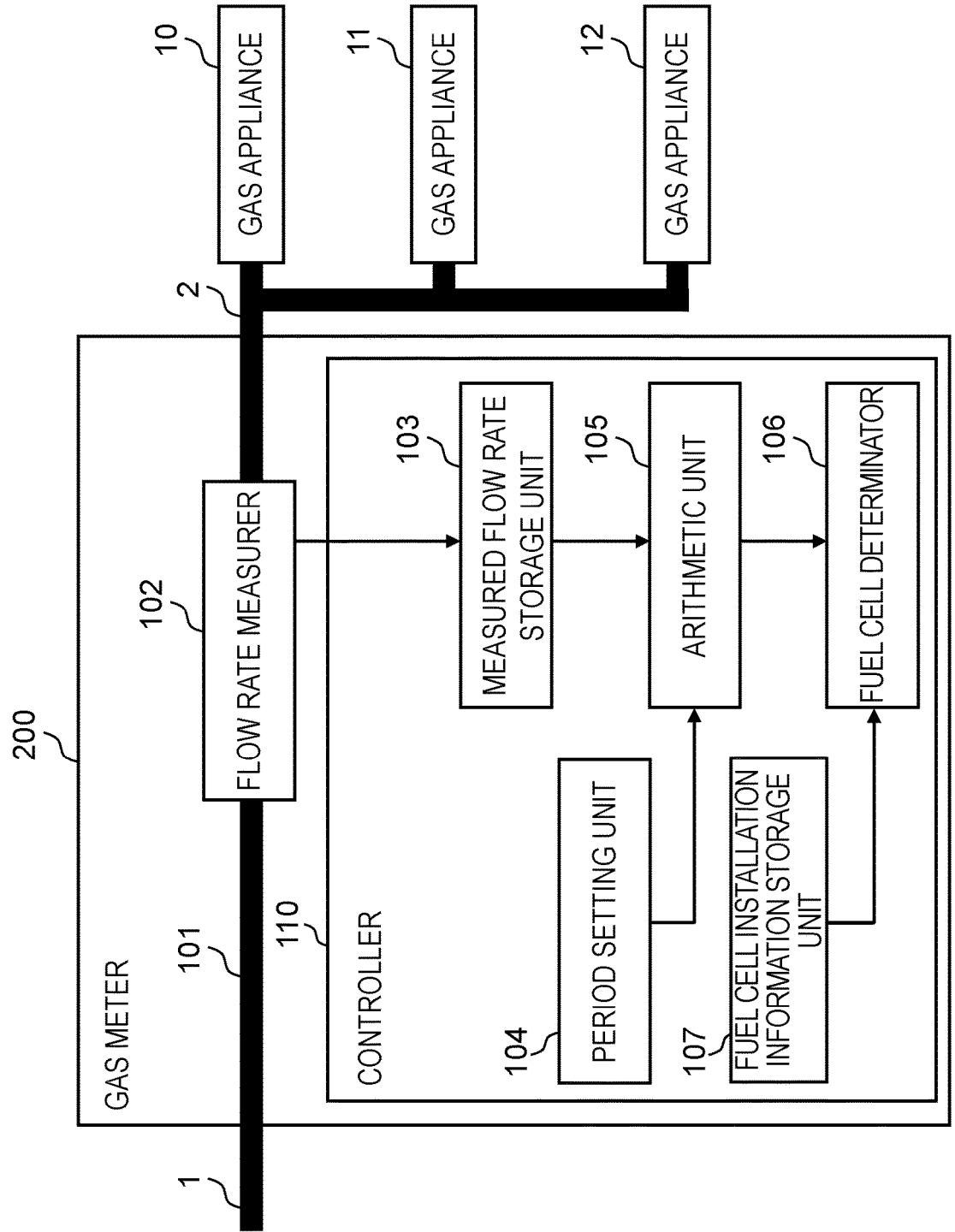
FIG. 7 is a block diagram showing an exemplary configuration of a gas meter that is a flow rate measurement device according to a second exemplary embodiment of the present invention.
Figure 8:
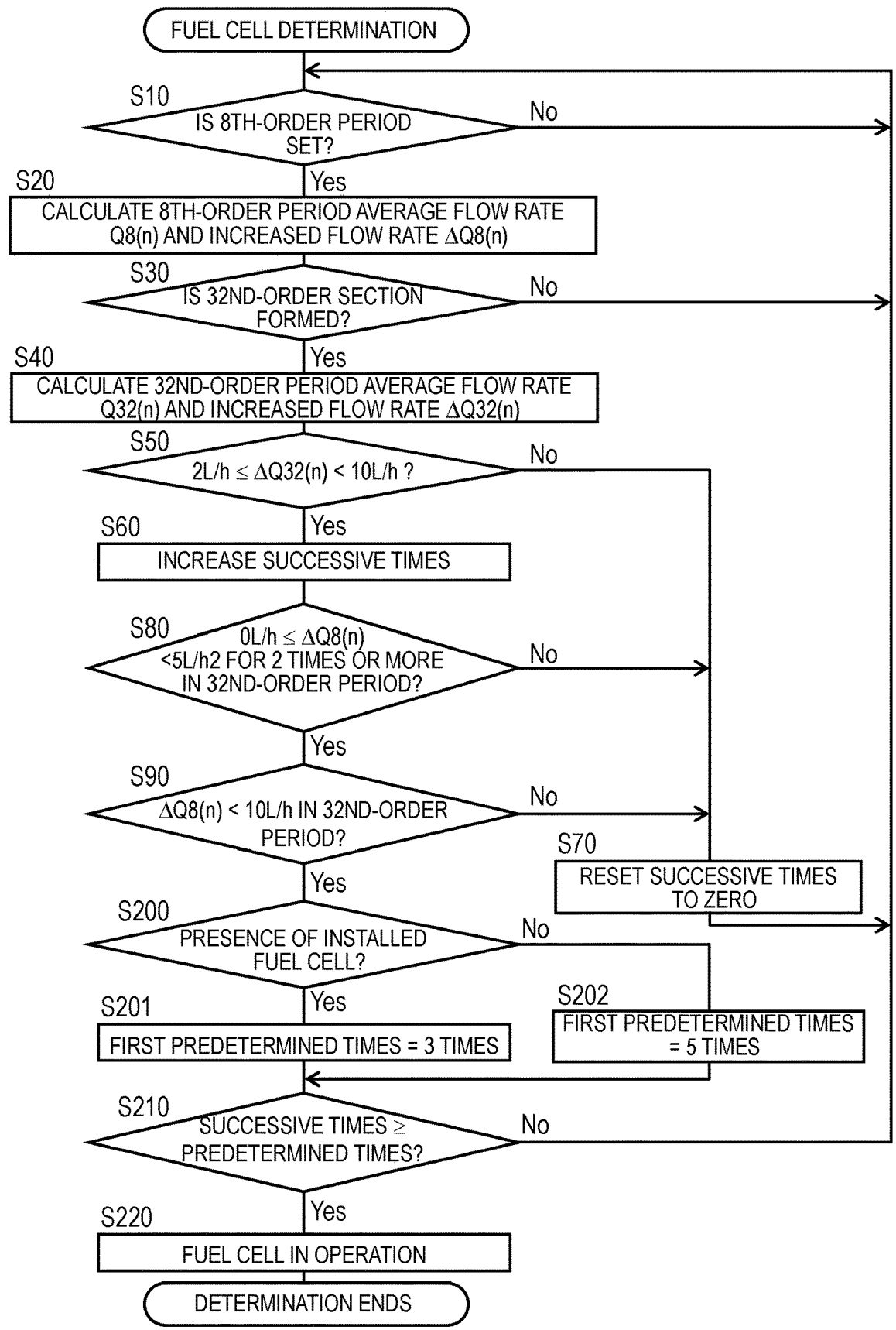
FIG. 8 is a flowchart of a process executed by a fuel cell determinator included in a flow rate measurement device according to the second exemplary embodiment of the present invention.

With reference to FIGS. 7 and 8, a flow rate measurement device according to a second exemplary embodiment of the present invention will now be described. FIG. 7 is a block diagram showing a configuration of gas meter 200 that is a flow rate measurement device according to the present exemplary embodiment and differs from the block diagram of gas meter 100 of the first exemplary embodiment shown in FIG. 1 in that fuel cell installation information storage unit 107 is added.

In FIG. 7, fuel cell installation information storage unit 107 stores information about whether or not a fuel cell is installed downstream of gas meter 200. Such information can be set up and stored in advance through electronic signals sent by operation of a switch (not shown) or communication when a fuel cell is installed. Alternatively, as described later, fuel cell installation information storage unit 107 may store information about installed fuel cell presence when fuel cell determinator 106 determines that a fuel cell is in operation.

Figure 5:
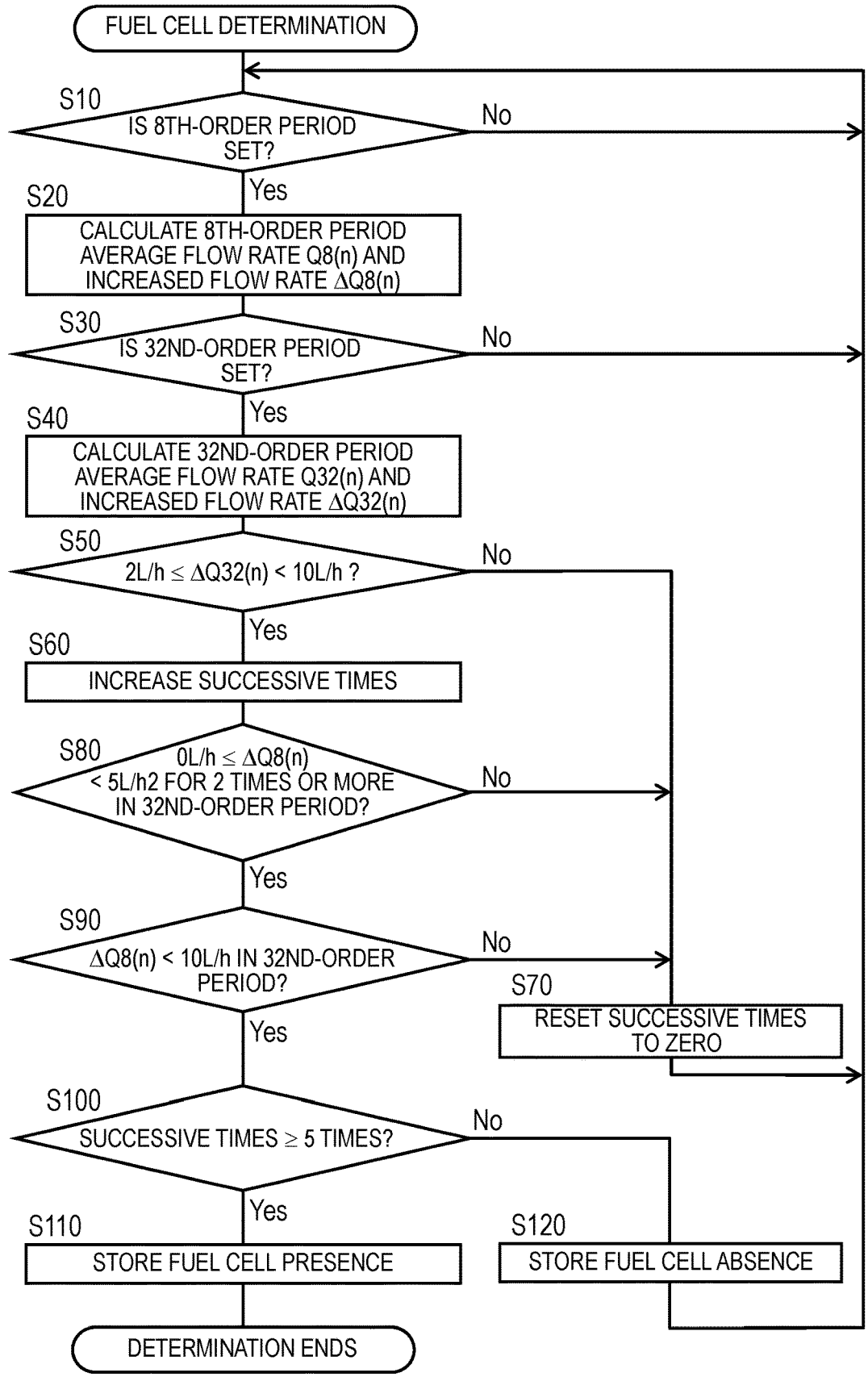
FIG. 5 is a flowchart of a process executed by a fuel cell determinator included in the flow rate measurement device according to the first exemplary embodiment of the present invention.

FIG. 8 is a flowchart of a process executed by fuel cell determinator 106 in the flow rate measurement device according to the present exemplary embodiment and differs from the process flowchart of FIG. 5 shown to illustrate the first exemplary embodiment in that step S100 and subsequent steps shown in FIG. 5 are replaced with steps S200 to S220. The following description is given of step S200 and subsequent steps.

When the fuel cell determinator determines that first 8th-order period average flow rate $\Delta Q8(n)$ is less than the third predetermined flow rate (e.g., less than 10 L/h) in the second 32nd-order period in step S90, the fuel cell determinator checks presence or absence of an installed fuel cell specified in fuel cell installation information storage unit 107 in step S200. When determining the presence of an installed fuel cell, the fuel cell determinator, for example, sets the first predetermined times, i.e., successive satisfaction times for conditions (a), (b), (c) established to determine that a fuel cell is in operation, to 3 times in step S201. When determining the absence of an installed fuel cell, the fuel cell determinator sets the first predetermined times to 5 times in step S202.

In step S210, if the number of the successive satisfaction times for conditions 1 to 3 is greater than or equal to the first predetermined times set in step S201 or step S202, the fuel cell determinator determines that the fuel cell is in operation (step S220). If the number of the successive times is less than the first predetermined times, the fuel cell determinator determines that the fuel cell is not in operation and returns to the process for determination again.

As described above, in the present exemplary embodiment, fuel cell installation information storage unit 107 stores information about whether or not a fuel cell is installed downstream of gas meter 200. This enables the gas meter to determine early that a fuel cell is in operation when the fuel cell is installed.

Gas flow rates measured by flow rate measurer 102 change (fluctuate) in some cases because of an installation environment and other factors. If such a change in flow rate occurs during determination of whether or not a fuel cell is in operation, the first predetermined times for which conditions (a) to (c) are satisfied are less likely to be in succession. This makes it difficult to determine that a fuel cell is in operation. However, a decrease in the number of the first predetermined times on condition that a fuel cell is installed enables the gas meter to determine early whether or not a fuel cell is in operation. This in turn facilitates determination of whether or not a fuel cell is in operation even in an installation environment where a change in flow rate occurs.

If, during determination of whether or not a fuel cell is in operation, another appliance is used, conditions (a) to (c) are not satisfied. As a result, despite the presence of an operating fuel cell, the gas meter cannot discriminate the fuel cell in operation. Meanwhile, technique in the present exemplary embodiment enables the gas meter to determine whether or not a fuel cell is in operation in a short span of time on condition that the fuel cell is installed. This reduces a chance that another gas appliance starts being used during determination of whether or not a fuel cell is in operation. This in turn increases accuracy with which the gas meter determines whether or not a fuel cell is in operation while the fuel cell is operating.

Thus, this technique can be applied to cases such as the implementation of a charge policy including a discount on the price charged for an amount of a gas consumed by a fuel cell.

Fuel cell installation information storage unit 107 may store information about installed fuel cell presence when fuel cell determinator 106 determines that a fuel cell is in operation. This eliminates the need for setting up such information in advance by switch operation or communication. In this case, the fuel cell determinator determines that a fuel cell is in operation with the first predetermined times set at 5 times for a first time and is allowed to determine that a fuel cell is in operation with the first predetermined times set at 3 times from a second time onward. This facilitates determination of whether or not a fuel cell is in operation even in an installation environment where a change in flow rate occurs.

The exemplary embodiments of the present invention have been described above. The description above of the exemplary embodiments exemplifies the present invention, and should not be construed to limit the scope of the present invention. In addition, exemplary embodiments can also be achieved in which components described in the exemplary embodiments above are appropriately combined. Modifications, replacements, additions, omission, and the like can be made to the present invention without departing from the scope of the claims or equivalents of the claims.

INDUSTRIAL APPLICABILITY

As described above, a flow rate measurement device according to the present invention can extract an appliance characteristic. Thus, this technique can be similarly applied to flow rate meters for industrial use and water meters to identify an appliance in use that is connected downstream of such a flow rate measurement device, as well as a group of the appliances.

REFERENCE MARKS IN THE DRAWINGS 10 to 12: gas appliance
100, 200: gas meter (flow rate measurement device)
101: flow path
102: flow rate measurer
103: measured flow rate storage unit
104: period setting unit
105: arithmetic unit
106: fuel cell determinator
107: fuel cell installation information storage unit
110: controller

The invention claimed is:

1. A flow rate measurement device comprising:
a flow rate measurer to measure a flow rate of a fluid at regular time intervals, the fluid flowing in a flow path;

a period setting unit to set a first period for M flow rates measured by the flow rate measurer and set a second period made up of N first periods each being the first period;

an arithmetic unit to calculate a first average flow rate of the M flow rates in the first period, and calculate a second average of M×N flow rates in the second period; and a fuel cell determinator to determine that a fuel cell is in operation when the first average flow rate and the second average flow rate calculated by the arithmetic unit satisfy all conditions (A), (B), and (C) specified below:

(A) an increment of the second average flow rate within a first predetermined flow rate range repeats for first predetermined successive times;

(B) an increment of the first average flow rate within a second predetermined flow rate range repeats for second predetermined times or more in each of the second periods; and (C) an increment of the first average flow rate not greater than or equal to a third predetermined flow rate in each of the second periods.

2. The flow rate measurement device according to claim 1, further comprising a fuel cell installation information storage unit to store information indicating whether or not a fuel cell is installed, wherein the fuel cell determinator changes the first predetermined successive times when the information stored in the fuel cell installation information storage unit indicates that the fuel cell is installed.

* * * * *